US009787483B2

(12) United States Patent
Liang et al.

(10) Patent No.: US 9,787,483 B2
(45) Date of Patent: Oct. 10, 2017

(54) METHOD, SYSTEM, AND CONTROLLER FOR ROUTING FORWARDING (71) Applicant: ZTE Corporation, Shenzhen, Guangdong (CN)

(72) Inventors: Shuang Liang, Shenzhen (CN); Yuzhen Huo, Shenzhen (CN); Jing Wang, Shenzhen (CN); Na Zhou, Shenzhen (CN)

(73) Assignee: XI'AN ZHONGXING NEW SOFTWARE CO. LTD., Xi'An (CN)

( * ) Notice: Subject to any disclaimer, the term of this patent is extended or adjusted under 35 U.S.C. 154(b) by 0 days.

(21) Appl. No.: 14/435,148

(22) PCT Filed: Oct. 10, 2013

(86) PCT No.: PCT/CN2013/084990
§ 371 (c)(1),
(2) Date: Apr. 10, 2015

(87) PCT Pub. No.: WO2014/056445
PCT Pub. Date: Apr. 17, 2014

(65) Prior Publication Data
US 2015/0280927 A1 Oct. 1, 2015

(30) Foreign Application Priority Data
Oct. 11, 2012 (CN) .......................... 2012 1 0384607

(51) Int. Cl.
H04L 12/16 (2006.01)
H04L 12/14 (2006.01)
(Continued)

(52) U.S. Cl.
CPC .......... H04L 12/1407 (2013.01); H04L 45/38 (2013.01); H04L 45/745 (2013.01);
(Continued)

(58) Field of Classification Search
USPC ........ 370/259, 229, 230, 235, 331, 332, 343
See application file for complete search history.

(56) References Cited

U.S. PATENT DOCUMENTS

2010/0027541 A1* 2/2010 Eriksson ............. H04W 72/005
370/390
2011/0261825 A1* 10/2011 Ichino ..................... H04L 45/38
370/400
(Continued)

FOREIGN PATENT DOCUMENTS

CN 102656911 A 9/2012
WO 2012033117 A1 3/2012

OTHER PUBLICATIONS

Supplementary European Search Report in European application No. 13846060.5, dated Jan. 20, 2016.
(Continued)

Primary Examiner — Phuongchau Ba Nguyen
(74) Attorney, Agent, or Firm — Oppedahl Patent Law Firm LLC (57) ABSTRACT A method for routing forwarding is provided. The method includes: a controller sends pre-generated routing flow tables to an Evolved Universal Terrestrial Radio Access Network (UTRAN) NodeB (eNB) and an Access Gateway (AGW) respectively; and the eNB and the AGW distribute data according to the received routing flow tables respectively. The controller sends the routing flow tables to the eNB and the AGW, so that the extended OpenFlow protocol can be applied to an Evolved Packet System (EPS), network upgrading cost is lowered, network upgrading can be simplified, and a network upgrading period can be shortened.

16 Claims, 8 Drawing Sheets (51) Int. Cl.

| | | |
|---|---|---|
| *H04L 12/721* | (2013.01) | |
| *H04L 12/741* | (2013.01) | |
| *H04M 15/00* | (2006.01) | |
| *H04W 72/04* | (2009.01) | |
| *H04W 76/02* | (2009.01) | |
| *H04W 88/12* | (2009.01) | |
| *H04W 88/16* | (2009.01) | |
| *H04W 8/12* | (2009.01) | |
| *H04W 8/20* | (2009.01) | |

(52) U.S. Cl.
CPC ......... *H04M 15/66* (2013.01); *H04W 72/042* (2013.01); *H04W 76/021* (2013.01); *H04W 8/12* (2013.01); *H04W 8/20* (2013.01); *H04W 76/02* (2013.01); *H04W 88/12* (2013.01); *H04W 88/16* (2013.01)

(56) References Cited

U.S. PATENT DOCUMENTS

| | | |
|---|---|---|
| 2012/0155391 A1 | 6/2012 | Kim |
| 2012/0252458 A1 | 10/2012 | Ohnishi |
| 2013/0166720 A1 | 6/2013 | Takashima |
| 2014/0146783 A1* | 5/2014 | Kim .................... H04W 76/021 370/329 |
| 2014/0321365 A1* | 10/2014 | Shoji .................... H04W 60/06 370/328 |

OTHER PUBLICATIONS

Vodafone Group:"The QoS Architecture of LTE", 3GPP Draft; S2H060430, 3rd Generation Partnership Project (3GPP), Mobile Competence Centre ; 650, Route Des Lucioles ; F-06921 Sophia-Antipolis Cedex ; France, vol. SA WG2, No. Paris; Mar. 28, 2006, Mar. 28, 2006 (Mar. 28, 2006), XP050229224, [retrieved on Mar. 28, 2006] * section 7.12.4 * * figures 7.12-1 *, mailed on Mar. 28, 2006.

International Search Report in international application No. PCT/CN2013/084990, dated Jan. 16, 2014.

English Translation of the Written Opinion of the International Search Authority in international application No. PCT/CN2013/084990, mailed on Jan. 16, 2014.

Moving the Mobile Evolved Packet Core to the Cloud Oct. 8, 2012.

Routing trees for multi-hop information broadcast over ENBs May 3, 2006.

Supplementary European Search Report in European application No. 13846060.5, dated Aug. 20, 2015.

* cited by examiner

METHOD, SYSTEM, AND CONTROLLER FOR ROUTING FORWARDING

TECHNICAL FIELD

The disclosure relates to the field of mobile communications, in particular to a method, system, and controller for routing forwarding.

BACKGROUND

Figure 1:
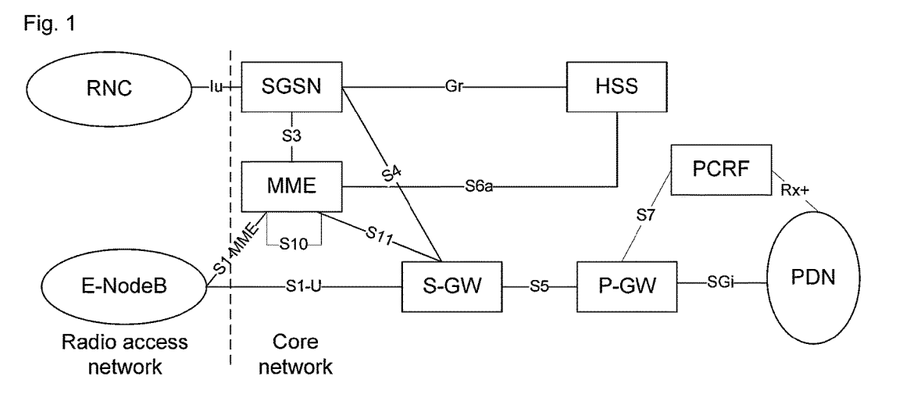
FIG. 1 is a structure diagram of a conventional EPS system.

In order to keep a 3rd-generation mobile communication system competitive in the field of communications, and to provide more personalized mobile communication service with a higher rate and a shorter time delay for a user and lower operation cost of an operator, the 3rd Generation Partnership Project (3GPP) standard working group is dedicated to a research on an Evolved Packet System (EPS). FIG. 1 shows a structure diagram of an EPS, as shown in FIG. 1, the whole EPS includes two parts: a Radio Access Network (RAN) and a core network. The core network includes a Home Subscriber Server (HSS), a Mobility Management Entity (MME), a Serving General Packet Radio Service (GPRS) Support Node (SGSN), a Policy and Charging Rule Function (PCRF), a Serving Gateway (SGW), a Packet Data Network (PDN) Gateway (PGW) and a PDN. Functions of each part will be detailed below:

the HSS includes all functions of a Home Location Register (HLR), is a permanent storage location for subscription data of a user, and is located in a home network subscribed by the user.

The MME is a storage location for the subscription data of the user in a current network, and is responsible for Non-Access Stratum (NAS) signalling management from a terminal to the network, security verification of the terminal, mobility management of the terminal, tracking and paging management in an idle mode of the user and bearer management.

The SGSN is a service support point for the access of Global System for Mobile Communication (GSM) Enhanced Data Rate for GSM Evolution (EDGE) Radio Access Network (GERAN) and Universal Terrestrial Radio Access Network (UTRAN) users to the core network, is functionally similar to the MME, and is responsible for the location updating of the user, paging management, bearer management and the like.

The SGW is a gateway from the core network to a wireless system, and is responsible for user plane bearing from the terminal to the core network, data caching in an idle mode of the terminal, the initiation of a service request by a network side, lawful interception and packet data routing and forwarding; and the SGW is responsible for making statistics on the use of the user terminal over the RAN, generating a ticket for the use of the terminal over the RAN, and sending the ticket to a charging gateway.

The PGW is a gateway of an evolved system and an external PDN of the system, is connected to the Internet and the PDN, and is responsible for the Internet Protocol (IP) address allocation of the terminal, charging, packet filtration, policy control and the like.

A Gateway GPRS Support Node (GGSN) supports an edge routing function of a GPRS network, that is, the GGSN is responsible for performing routing forwarding on the data of the GPRS network, and protecting the integrity of the data of the GPRS network by virtue of a firewall and a filtering function. The GGSN also has a charging function.

The PGW includes all the functions of the GGSN, that is, it can be considered that the GGSN is embedded into the PGW as a sub-function of the PGW. Therefore, the SGSN can be directly connected with the PGW through a Gn/Gp interface.

The PDN is an IP service network of the operator, and provides IP service for the user through the core network of the operator.

The PCRF is a server responsible for providing charging control, online credit control, threshold control and Quality of Service (QoS) policy rules in the evolved system.

The RAN consists of an Evolved Universal Terrestrial Radio Access Network (UTRAN) NodeB (eNB) and a 3G Radio Network Controller (RNC), and is mainly responsible for receiving and sending a radio signal, contacting with the terminal through an air interface and managing a radio resource, resource scheduling and access control of the air interface.

After the six-year development of the EPS since introduction from a 3GPP Release 8 (R8) stage in 2006, new functions are gradually introduced, and almost the function introduction of every time involves the modification of the above functional network elements. Such modification may increase the network upgrading cost of the operator on one hand, and on the other hand, the non-uniformity of degrees of support of different network elements to different functions may also cause a lot of connection test problems because different equipment is provided by different equipment suppliers.

SUMMARY

In view of this, a main purpose of the embodiment of the disclosure is to provide a method and system, and controller for routing forwarding, which can establish a routing forwarding path according to an extended OpenFlow protocol so as to lower network operation cost.

In order to achieve the purpose, the technical solutions of the embodiment of the disclosure are implemented as follows.

A method for routing forwarding includes: sending, by a controller, pre-generated routing flow tables to an Evolved Universal Terrestrial Radio Access Network (UTRAN) NodeB (eNB) and an Access Gateway (AGW) respectively; and distributing, by the eNB and the AGW, data according to the received routing flow tables.

Preferably, the method may further include: acquiring, by the controller, an identifier of a User Equipment (UE) and related information of the UE; and generating, by the controller, the routing flow tables according to the identifier of the UE and the related information of the UE, wherein, the related information of the UE may include UE subscription information and UE policy information.

Preferably, the acquiring the identifier of the UE and the UE subscription information by the controller may include:

receiving, by the controller, a session creation request from a Mobility Management Entity (MME), and acquiring the identifier of the UE and the UE subscription information included in the session creation request; or receiving, by the controller, the session creation request from the MME, acquiring the identifier of the UE included in the session creation request, and interacting with a Home Subscriber Server (HSS) to acquire the UE subscription information.

Preferably, the acquiring the policy information by the controller may include:

acquiring, by the controller, own preconfigured policy information, or acquiring the policy information from a Policy and Charging Rule Function (PCRF).

Preferably, the sending the pre-generated routing flow table to the eNB by the controller may include:

sending, by the controller, the routing flow table to the eNB by sending an Addition (Add) message to the eNB;

the distributing the data by the eNB according to the received routing flow table may include:

establishing, by the eNB, a radio bearer according to Quality of Service (QoS) information and bearer identification information in the routing flow table, and notifying an MME after establishing the bearer; and the sending the pre-generated routing flow table to the AGW by the controller may include:

sending, by the controller, the routing flow table to the AGW by sending an Add message to the AGW after the establishing the radio bearer is finished.

Preferably, the sending the pre-generated routing flow tables to the eNB and the AGW respectively by the controller may include:

sending, by the controller, the routing flow tables to the eNB and the AGW by sending an Add messages to the eNB and the AGW respectively; and the distributing the data according to the received routing flow table by the eNB may include:

establishing, by the eNB, a radio bearer according to QoS information and bearer identification information in the routing flow table, and notifying an MME after establishing the bearer.

Preferably, the routing flow table sent to the AGW may include a caching instruction of caching downlink data when the AGW receives the downlink data; and correspondingly, the method may further include: before the distributing the data according to the received routing flow table by the AGW, sending, by the controller, an updating message to the AGW after the establishing the radio bearer is finished, and notifying the AGW to stop caching the downlink data.

Preferably, the distributing the data according to the received routing flow table by the AGW may include:

establishing, by the AGW, a distribution path for distributing the data according to the QoS information and the bearer identification information in the routing flow table.

Preferably, the sending the pre-generated routing flow tables to the eNB and the AGW respectively by the controller may include:

sending, by the controller, an Add messages to the eNB and the AGW so as to send the routing flow tables to the eNB and the AGW respectively after establishing a radio bearer is finished.

Preferably, the sending the pre-generated routing flow tables to the eNB and the AGW respectively by the controller may include:

sending, by the eNB, a routing flow table request to the controller according to a preconfigured controller address or a controller address sent from an MME after receiving Uplink (UL) DATA from a User Equipment (UE); and sending, by the controller, an Add messages to the eNB and the AGW so as to send the routing flow tables to the eNB and the AGW respectively after receiving the routing flow table request.

Preferably, the sending the pre-generated routing flow table to the AGW by the controller may include:

sending, by the controller, the routing flow table to the AGW by sending an Add message to the AGW, wherein the routing flow table may include a caching instruction of caching downlink data when the AGW receives the downlink data;

correspondingly, the sending the pre-generated routing flow table to the eNB by the controller may include:

sending, by the controller, an Add message to the eNB so as to send the routing flow table to the eNB after establishing a radio bearer is finished; and the distributing the data according to the received routing flow table by the AGW may include:

sending, by the controller, an updating message to the AGW after establishing the radio bearer is finished, and notifying the AGW to stop caching the downlink data and distribute the received downlink data according to the routing flow table.

A system for routing forwarding includes a UE and an MME, and further includes: a controller, an eNB and an AGW, wherein the controller is configured to send pre-generated routing flow tables to the eNB and the AGW respectively; and the eNB and the AGW are configured to distribute data according to the received routing flow tables respectively.

Preferably, the controller may be further configured to acquire an identifier of the UE and related information of the UE, and to generate the routing flow tables according to the identifier of the UE and the related information of the UE; wherein the related information of the UE may include UE subscription information and UE policy information.

Preferably, the controller may be configured to receive a session creation request from the MME, and to acquire the identifier of the UE and the UE subscription information included in the session creation request; or to receive the session creation request from the MME, to acquire the identifier of the UE included in the session creation request, and to interact with a Home Subscriber Server (HSS) to acquire the UE subscription information.

Preferably, the controller may be configured to acquire own preconfigured policy information, or to acquire the policy information from a Policy and Charging Rule Function (PCRF).

Preferably, the controller may be configured to send the routing flow table to the eNB by sending an Addition (Add) message to the eNB, and is further configured to send the routing flow table to the AGW by sending an Add message to the AGW after establishing a radio bearer is finished; and the eNB may be configured to establish the radio bearer according to Quality of Service (QoS) information and bearer identification information in the routing flow table, and to notify the MME after establishing the bearer.

Preferably, the controller may be configured to send an Add messages to the eNB and the AGW so as to send the routing flow tables to the eNB and the AGW respectively; and the eNB may be configured to establish a radio bearer according to QoS information and bearer identification information in the routing flow table, and to notify the MME after establishing the bearer.

Preferably, the routing flow table sent to the AGW may include a caching instruction of caching downlink data when the AGW receives the downlink data; and the controller may be further configured to send an updating message to the AGW after the establishing the radio bearer is finished, and to notify the AGW to stop caching the downlink data.

Preferably, the AGW may be configured to establish a distribution path for distributing the data according to the QoS information and the bearer identification information in the routing flow table.

Preferably, the controller may be configured to send an Add messages to the eNB and the AGW so as to send the routing flow tables to the eNB and the AGW respectively after establishing a radio bearer is finished.

Preferably, the eNB may be configured to send a routing flow table request to the controller according to a preconfigured controller address or a controller address sent from the MME after receiving Uplink (UL) DATA from the UE; and the controller may be configured to send an Add messages to the eNB and the AGW so as to send the routing flow tables to the eNB and the AGW respectively after receiving the routing flow table request.

Preferably, the controller may be configured to send the routing flow table to the AGW by sending an Add message to the AGW; wherein the routing flow table may include a caching instruction of caching downlink data when the AGW receives the downlink data; and the controller may be further configured to send an Add message to the eNB so as to send the routing flow table to the eNB after establishing a radio bearer is finished, to send an updating message to the AGW, and to notify the AGW to stop caching the downlink data and distribute the received downlink data according to the routing flow table.

A controller includes a sending module, which is configured to send pre-generated routing flow tables to an Evolved Universal Terrestrial Radio Access Network (UTRAN) NodeB (eNB) and an Access Gateway (AGW) respectively.

Preferably, the sending module may be further configured to acquire an identifier of a User Equipment (UE) and related information of the UE, and to generate the routing flow tables according to the identifier of the UE and the related information of the UE; wherein the related information of the UE may include UE subscription information and UE policy information.

Preferably, the sending module may be configured to send the routing flow table to the eNB by sending an Addition (Add) message to the eNB, and may be further configured to send the routing flow table to the AGW by sending an Add message to the AGW after establishing a radio bearer is finished.

Preferably, the sending module may be configured to send an Add messages to the eNB and the AGW so as to send the routing flow tables to the eNB and the AGW respectively.

Preferably, the routing flow table sent to the AGW may include a caching instruction of caching downlink data when the AGW receives the downlink data; and the sending module may be further configured to send an updating message to the AGW after establishing a radio bearer is finished, and to notify the AGW to stop caching the downlink data.

Preferably, the sending module may be configured to send an Add messages to the eNB and the AGW so as to send the routing flow tables to the eNB and the AGW respectively after establishing a radio bearer is finished.

Preferably, the sending module may be configured to send an Add messages to the eNB and the AGW so as to send the routing flow tables to the eNB and the AGW respectively after receiving a routing flow table request from the eNB.

Preferably, the sending module may be configured to send the routing flow table to the AGW by sending an Add message to the AGW; wherein the routing flow table may include a caching instruction of caching downlink data when the AGW receives the downlink data; and the sending module may be further configured to send an Add message to the eNB so as to send the routing flow table to the eNB after establishing a radio bearer is finished, to send an updating message to the AGW, and to notify the AGW to stop caching the downlink data and distribute the received downlink data according to the routing flow table.

According to the embodiment of the disclosure, the controller sends the routing flow tables to the eNB and the AGW, so that the extended OpenFlow protocol can be applied to an EPS, network upgrading cost is lowered, network upgrading can be simplified, and a network upgrading period can be shortened.

DETAILED DESCRIPTION

An OpenFlow protocol proposed by Stanford University of the USA in 2008 adopts a forwarding/control separation architecture, an external control plane entity controls forwarding plane device to implement various forwarding logics by adopting the OpenFlow protocol, a main function of the forwarding plane device is to execute controlled forwarding according to a flow table sent from an OpenFlow controller, and its behaviour is standardized as follows: a message is received, a related field value of a header of the message is extracted as a keyword for looking up the flow table, a message field is transformed according to an instruction set in an entry content after an entry is matched, and the transformed message field is forwarded to a certain logic or physical port according to an instruction after being transformed. The protocol is further evolved into a Software Defined Network (SDN) technology, that is, various complex network applications can be implemented without any change in the forwarding plane device by virtue of software programming on a control plane; and because the control plane adopts a universal server and a universal operating system, and can be implemented by virtue of a universal software programming tool as well as a script programming language such as Python, new network protocol support becomes very simple, and a deployment period of the new technology is greatly shortened.

However, it can be seen that the introduction of the concept of SDN into an EPS may solve a problem caused by the introduction of a new function into an EPS network. At present, those involved in the OpenFlow protocol are all based on layer 2 switching or layer 3 routing, so that corresponding extension for realize necessary functions required by the EPS is required by the introduction of the OpenFlow protocol into the EPS network.

In the embodiment of the disclosure: a controller sends pre-generated routing flow tables to an eNB and an AGW respectively; and the eNB and the AGW distribute data according to the received routing flow tables respectively.

In order to make clearer the purpose, technical solutions and advantages of the disclosure, the disclosure is further described below with reference to embodiments and the drawings in detail.

Figure 2:
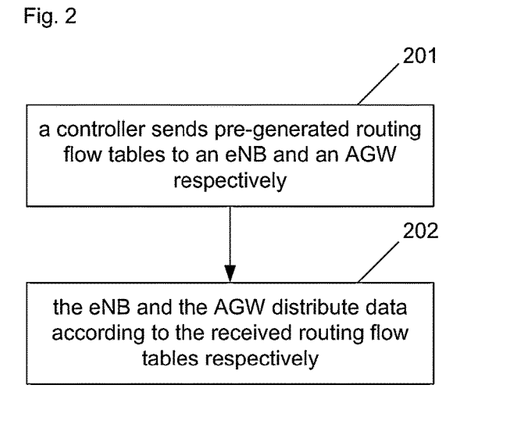
FIG. 2 is an implementation flowchart of a method for routing forwarding according to an embodiment of the disclosure.

FIG. 2 shows an implementation flow of a method for routing forwarding according to an embodiment of the disclosure, as shown in FIG. 2, the method includes:

Step 201: a controller sends pre-generated routing flow tables to an eNB and an AGW respectively.

Specifically, the controller sends the routing flow table to the eNB by sending an Addition (Add) message to the eNB; and the controller sends the routing flow table to the AGW by sending an Add message to the AGW after the establishment of a radio bearer is finished; or the controller sends the routing flow tables to the eNB and the AGW by sending the Add messages to the eNB and the AGW respectively, wherein the routing flow table sent to the AGW may further include a caching instruction of caching downlink data when the AGW receives the downlink data; or the controller sends the Add messages to the eNB and the AGW so as to send the routing flow tables to the eNB and the AGW respectively after the establishment of the radio bearer is finished; or the eNB sends a routing flow table request to the controller according to a preconfigured controller address or a controller address sent from an MME when receiving uplink data from UE; and the controller sends the Add messages to the eNB and the AGW so as to send the routing flow tables to the eNB and the AGW respectively after receiving the routing flow table request; or the controller sends the routing flow table to the AGW by sending the Add message to the AGW, wherein the routing flow table includes the caching instruction of caching the downlink data when the AGW receives the downlink data; and the controller sends the Add message to the eNB so as to send the routing flow table to the eNB after the establishment of the radio bearer is finished. Here, the Add message may specifically be a routing flow table sending message.

In addition, before the step, the method may further include: the controller acquires an identifier of the UE and related information of the UE; and the controller generates the routing flow tables according to the identifier of the UE and the related information of the UE, wherein the related information of the UE includes UE subscription information and UE policy information.

Specifically, the controller acquires the identifier of the UE and the UE subscription information in a manner as follows: the controller receives a session creation request from the MME, and acquires the identifier of the UE and the UE subscription information, which are included in the session creation request; or the controller receives a session creation request from the MME, acquires the identifier of the UE included in the session creation request, and interacts with an HSS to acquire the UE subscription information and charging information.

The step that the controller acquires the policy information includes: the controller acquires own preconfigured policy information or acquires the policy information from a PCRF.

Step 202: the eNB and the AGW distribute data according to the received routing flow tables respectively.

After the eNB receives the routing flow table sent by sending the Add message from the controller, the eNB establishes the radio bearer according to QoS information and bearer identification information in the routing flow table, and notifies the MME after establishing the bearer;

or, when the eNB receives the routing flow table from the controller, the routing flow table received by the AGW further includes: the caching instruction of caching the downlink data when the AGW receives the downlink data; the eNB establishes the radio bearer according to the QoS information and the bearer identification information in the routing flow table, and sends an initial context establishment response or a bearer establishment response to the MME;

the controller sends an updating message to the AGW after the establishment of the radio bearer is finished, and notifies the AGW to stop caching the downlink data and distribute the received downlink data according to the routing flow table; or under the condition that the routing flow table received by the AGW includes the caching instruction and the controller sends the routing flow table to the eNB after the establishment of the radio bearer is finished, the controller sends the updating message to the AGW after the establishment of the radio bearer is finished, and notifies the AGW to stop caching the downlink data and distribute the received downlink data according to the routing flow table.

The above method is further described below with reference to specific embodiments, wherein an SGW and a PGW can be combined under a non-roaming condition or a local access condition in a roaming scenario. When the SGW and the PGW are combined, it is called an Access Gateway (AGW). The two network elements SGW and PGW are not required to interactively establish a forwarding path by themselves in the embodiment of the disclosure, and the establishment of the forwarding path is completed by the controller. In addition, original functions of IP address allocation or IP address allocation assistance, policy transmission and the like of the PGW are also be realized by the controller. A subsequent flow in the embodiment of the disclosure is described by considering that the SGW and the PGW are combined as the AGW. The embodiment of the disclosure is described by taking the scenario that the SGW and the PGW are combined as an example, and in a scenario that the SGW and the PGW are not combined, the controller is required to send the routing flow table to the two network elements respectively by a similar process.

Figure 3:
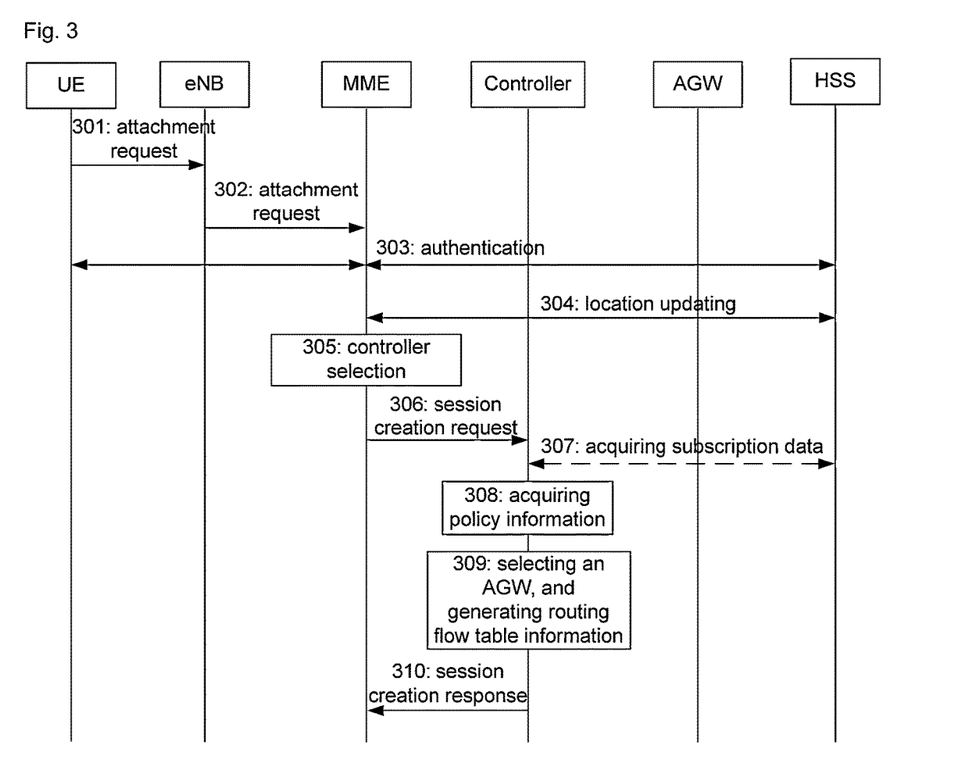
FIG. 3 is an implementation flowchart of a method for routing forwarding according to embodiment 1 of the disclosure.

FIG. 3 shows an implementation flow of a method for routing forwarding according to embodiment 1 of the disclosure, embodiment 1 specifically describes a generation process of a routing flow table in an attachment process, as shown in FIG. 3, embodiment 1 includes the following steps:

Steps 301 to 302: a UE initiates an attachment request to an MME through an eNB.

Step 303: the MME judges whether to initiate an authentication process to the UE or not; if yes, then the authentication process is implemented among the UE, the MME and an HSS.

Step 304: the MME interacts with the HSS for a location updating process, and acquires subscription data of a user.

Step 305: the MME selects a proper controller to serve the user.

Here, the MME may select the proper controller by local pre-configuration, and may also dynamically query address information of the controller through a Domain Name Server (DNS). When the later manner is adopted, a manner similar to a conventional SGW/PGW selection manner can be adopted, and a Fully Qualified Domain Name (FQDN) is structured by a base station identifier, a tracking area identifier or an Access Point Name (APN) to query an address of the controller.

Step 306: the MME sends a session creation request to the selected controller, wherein the session creation request includes an identifier of the UE.

Wherein, the session creation request may optionally include QoS information, charging information and the like, which are permitted by the subscription of the UE, and when the information is included, the controller does not execute step 307, and directly executes step 308.

Step 307: when the MME does not send the QoS information, charging information and the like, which are permitted by the subscription of the UE, to the controller, the controller interacts with the HSS to acquire the subscription data of the UE.

Step 308: the controller acquires policy information of the UE.

Specifically, when a PCRF is deployed in a network, the controller can also interact with the PCRF and acquire the policy information generated for the UE by the PCRF; otherwise, the controller directly utilizes locally preconfigured related policy information.

Step 309: the controller selects a proper AGW for the UE according to the acquired information of the UE, and generates the routing flow table according to the related information of the UE and the related policy information.

Step 310: the controller returns a session creation response message to the MME.

All of embodiments 2 to 6 shown in FIG. 4 to FIG. 9 may be data path establishment processes after an attachment flow, a service request flow, a Tracking Area Update (TAU) flow and a PDN connection establishment process.

Figure 4:
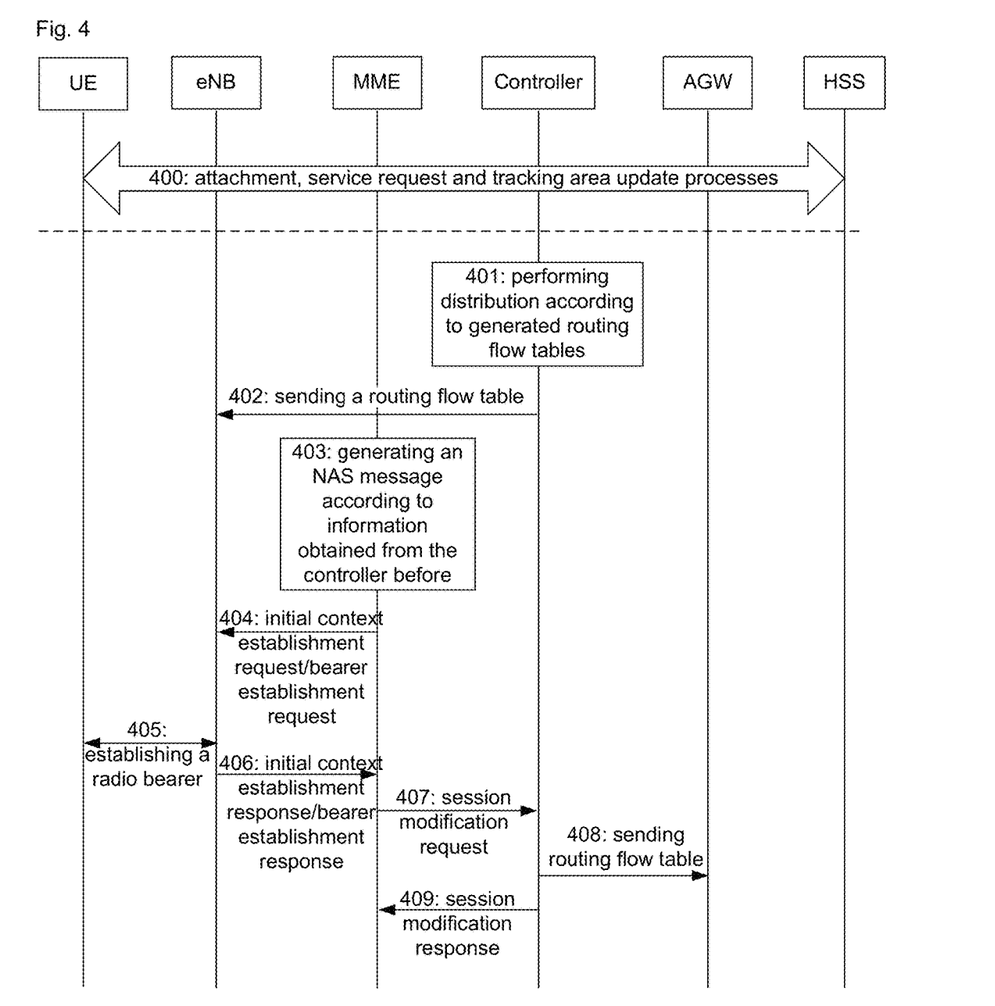
FIG. 4 is an implementation flowchart of a method for routing forwarding according to embodiment 2 of the disclosure.

FIG. 4 shows an implementation flow of a method for routing forwarding according to embodiment 2 of the disclosure, and embodiment 2 is an implementation mode 1 of establishing a routing forwarding path. The implementation mode is applied to the condition that a controller obtains the notification of an MME in a previous process and generates a routing flow table, or has obtained necessary information for the generation of the routing flow table. For example, in an attachment process, the MME notifies the controller to generate a corresponding routing flow table through a session creation request.

Step 400: an attachment process, a service request process, a TAU process and the like are executed.

In the process, the controller has obtained necessary information for generating the flow table, or has generated the flow table.

Steps 401 to 402: the controller performs distribution according to the generated routing flow table, and sends an Add message to an eNB so as to send a corresponding routing flow table to the eNB.

Wherein, the routing flow table includes information such as extended identification information of a user, a user plane forwarding address and a bearer identifier. When GPRS Tunnelling Protocol for the User Plane (GTP-U) is used as a routing forwarding protocol in a network, the routing flow table further includes tunnel end identifiers and addresses of an AGW and the eNB. When Proxy Mobile IP (PMIP) is used as the routing forwarding protocol in the network, the routing flow table further includes universal routing packaging identifiers of the AGW and the eNB.

Furthermore, the Add message may be a nonresponsive message as well as a responsive message, and when the Add message is a responsive message, the eNB may further return a response message to the controller after receiving the routing flow table.

Step 403: the MME generates a corresponding NAS message according to information acquired from the controller before.

Specifically, for example, in the attachment process, the controller sends a session creation response message to the MME, and the MME generates an attachment acceptance message; in a Public Data Network (PDN) connection request process, the MME is required to generate a PDN connection establishment acceptance message; and in the TAU process, the MME is required to generate a TAU acceptance message. Particularly, in the service request process, no NAS message will be generated. Therefore, the step is skipped in the service request process.

Step 404: the MME sends an initial context establishment request or a bearer establishment request to the eNB.

Here, when the MME generates the NAS message in step 403, the NAS message is also included in the above message.

Step 405: the eNB establishes a radio bearer according to QoS information and bearer identification information in the received routing flow table.

Step 406: the eNB sends an initial context establishment response or a bearer establishment response to the MME after establishing the radio bearer.

Step 407: the MME sends a session modification request to the controller.

Step 408: the controller knows that the radio bearer has been successfully established in step 407. The controller sends an Add message to the AGW so as to send a corresponding routing flow table to the AGW.

Here, the routing flow table includes the information such as the extended identification information of the user, the user plane forwarding address and the bearer identifier. When GTP-U is used as the routing forwarding protocol in the network, the routing flow table further includes the tunnel end identifiers and addresses of the AGW and the eNB. When PMIP is used as the routing forwarding protocol in the network, the routing flow table further includes the universal routing packaging identifiers of the AGW and the eNB.

Similar to step 402, furthermore, the Add message may be a nonresponsive message as well as a responsive message, and when the Add message is a responsive message, the AGW may further return a response message to the controller after receiving the routing flow table.

Step 409: the controller returns a session modification response to the MME.

Figure 5:
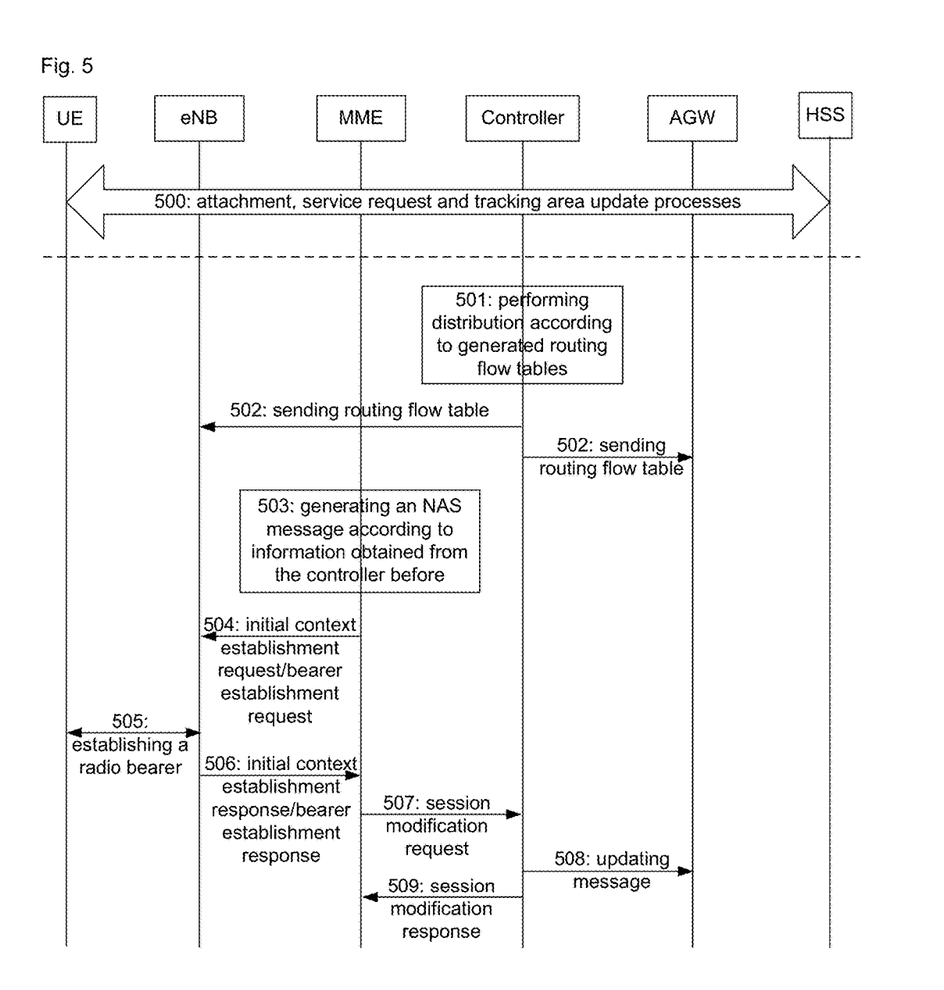
FIG. 5 is an implementation flowchart of a method for routing forwarding according to embodiment 3 of the disclosure.

FIG. 5 shows an implementation flow of a method for routing forwarding according to embodiment 3 of the disclosure, and embodiment 3 is implementation mode 2 of establishing a routing forwarding path. An application scenario and process of the implementation mode are similar to those of embodiment 2, the difference is made in step 502 and step 508, and the other similar steps will not be repeated.

Step 502: a controller sends Add messages to an eNB and an AGW so as to send corresponding routing flow tables respectively.

Here, the routing flow tables include information such as extended identification information of a user, a user plane forwarding address and a bearer identifier. When GTP-U is used as a routing forwarding protocol in a network, the routing flow tables further include tunnel end identifiers and addresses of the AGW and the eNB. When PMIP is used as the routing forwarding protocol in the network, the routing flow tables further include universal routing packaging identifiers of the AGW and the eNB.

Wherein, the routing flow table sent to the AGW by the controller is also required to include a caching instruction for instructing the AGW to cache downlink data when the AGW receives the downlink data.

Here, the Add messages may be nonresponsive messages as well as responsive messages; and when the Add messages are responsive messages, the eNB and the AGW may further return response messages to the controller after receiving the routing flow tables.

Step 508: the controller knows that a radio bearer has been successfully established in step 507, sends an updating message to the AGW, and notifies the AGW to stop caching the data and start distributing the data according to flow table information received before.

It should be noted that step 508 and step 509 can be executed in a random sequence.

Figure 6:
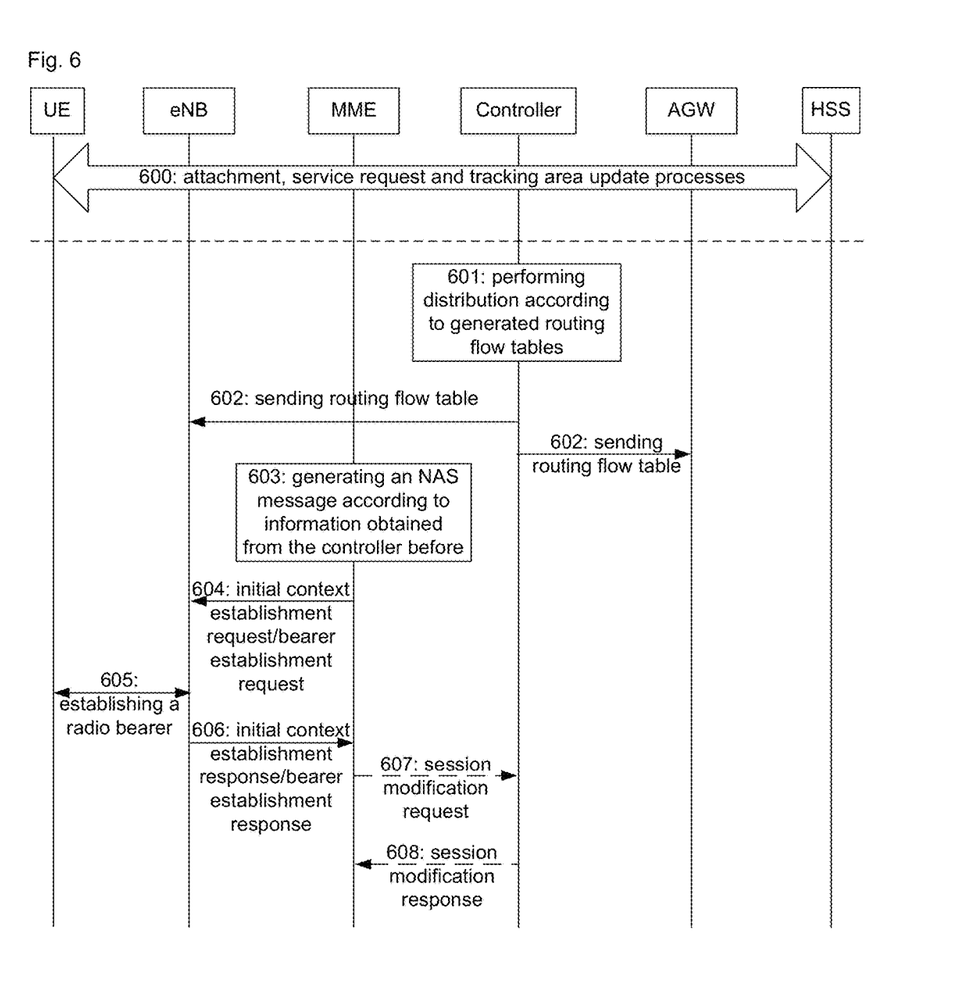
FIG. 6 is an implementation flowchart of a method for routing forwarding according to embodiment 4 of the disclosure.

FIG. 6 shows an implementation flow of a method for routing forwarding according to embodiment 4 of the disclosure, and embodiment 4 is implementation mode 3 of establishing a routing forwarding path. An application scenario and process of the implementation mode are similar to those of embodiment 3, the difference is made in step 602 and steps after step 607, and the other similar steps will not be repeated.

The difference between step 602 and step 502 is that a routing flow table sent to an AGW by a controller does not include a caching instruction. Therefore, when the AGW receives downlink data, the downlink data can be directly sent to an eNB according to information included in the flow table, the eNB may locally cache the data if a radio bearer has not yet been established at this time, and the data is directly sent after the radio bearer is established.

The routing flow table sent to the AGW does not include the caching instruction, so that the controller is not required to notify the AGW to stop caching the downlink data, and all of step 607 and the steps thereafter may be optional steps.

Figure 7:
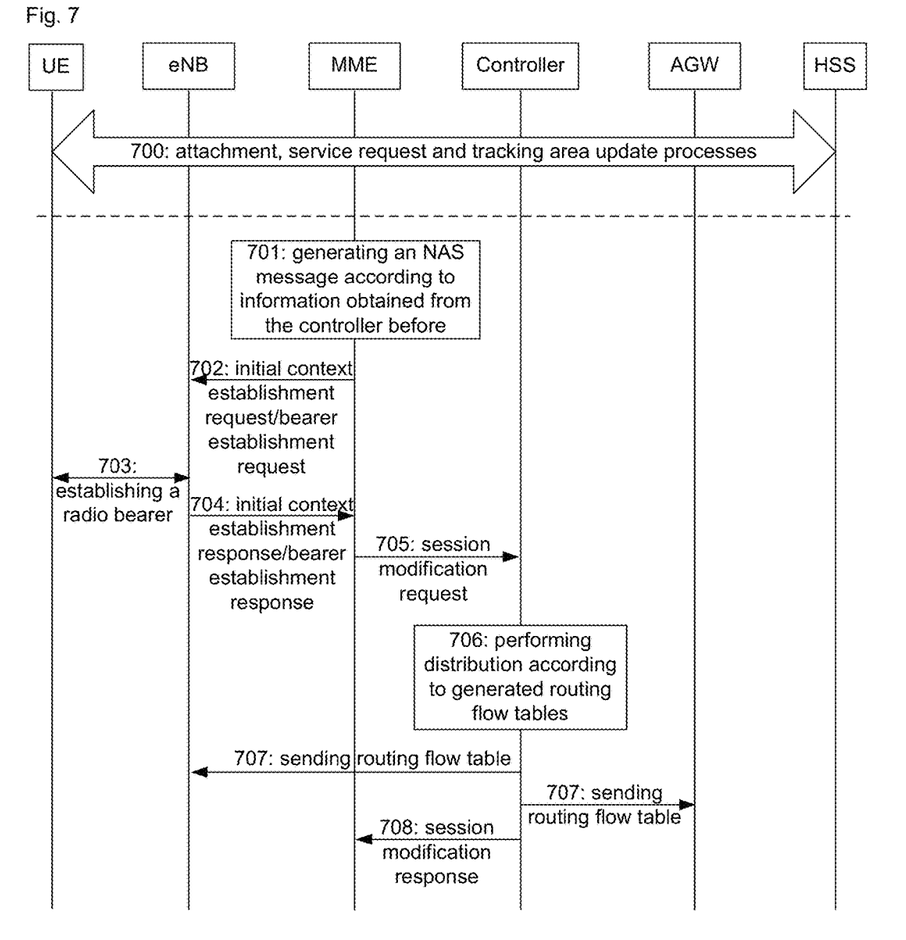
FIG. 7 is an implementation flowchart of a method for routing forwarding according to embodiment 5 of the disclosure.

FIG. 7 shows an implementation flow of a method for routing forwarding according to embodiment 5 of the disclosure, and embodiment 5 is implementation mode 4 of establishing a routing forwarding path. Embodiment 5 is applied to the condition that a controller obtains the notification of an MME in a previous process and generates a flow table, or has obtained necessary information for the generation of the flow table. For example, in an attachment process, the MME notifies the controller to generate a corresponding flow table through a session creation request.

Step 700: an attachment process, a service request flow, a TAU process and the like are executed.

Specifically, in the process, the controller has generated the flow table, or has obtained the necessary information for the generation of the flow table. Authorized QoS and bearer identification information is notified to the MME.

Steps 701: the MME generates a corresponding NAS message according to information acquired from the controller before. Specifically, for example: in the attachment process, the controller sends a session creation response message to the MME, and the MME generates an attachment acceptance message; in a PDN connection request process, the MME is required to generate a PDN connection establishment acceptance message; and in the TAU process, the MME is required to generate a TAU acceptance message. Particularly, in a service request process, no NAS message will be generated. Therefore, the step is skipped in the service request process.

Step 702: the MME sends an initial context establishment request or a bearer establishment request to an eNB.

Wherein, the messages include necessary information for the bearer establishment of the eNB, including a bearer identifier, a QoS parameter of a bearer and the like. When the MME generates the NAS message in step 701, the NAS message is also included in the above message.

Step 703: the eNB establishes the radio bearer according to the QoS information and the bearer identification information in a routing flow table after receiving the message in step 702.

Step 704: the eNB sends an initial context establishment response or a bearer establishment response to the MME after establishing the radio bearer.

Step 705: the MME sends a session modification request.

Steps 706 to 707: the controller knows that the radio bearer has been successfully established in step 705. The controller sends Add messages to the eNB and an AGW so as to send corresponding routing flow tables to the eNB and the AGW respectively.

Specifically, the routing flow tables include information such as extended identification information of a user, a user plane forwarding address and a bearer identifier. When GTP-U is used as a routing forwarding protocol in a network, the routing flow tables further include tunnel end identifiers and addresses of the AGW and the eNB. When PMIP is used as the routing forwarding protocol in the network, the routing flow tables further include universal routing packaging identifiers of the AGW and the eNB.

Here, the Add messages may be nonresponsive messages as well as responsive messages, and when the Add messages is responsive messages, the eNB and the AGW may further return response messages to the controller after receiving the routing flow tables respectively.

Step 708: the controller returns a session modification response to the MME.

It should be understood that there is no strict sequence between steps 706 to 707 and step 708.

Figure 8:
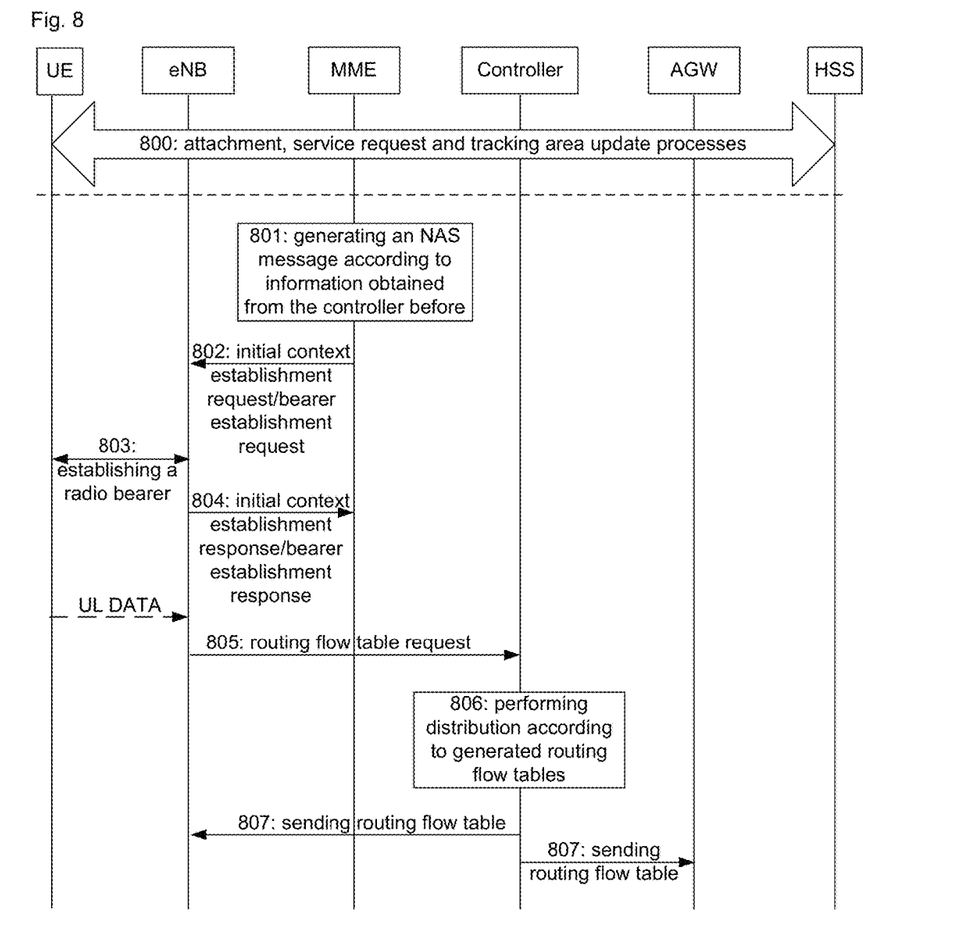
FIG. 8 is an implementation flowchart of a method for routing forwarding according to embodiment 6 of the disclosure.

FIG. 8 shows an implementation flow of a method for routing forwarding according to embodiment 6 of the disclosure, and embodiment 6 is implementation mode 5 of establishing a routing forwarding path. Embodiment 6 is similar to embodiment 5, and the difference is how to trigger a manner of sending a routing flow table, i.e. related processing after step 804. Wherein, processing in steps 800 to 804 is similar to steps 700 to 704, and will not be repeated here.

In step 802, an MME sends an initial context establishment request or a bearer establishment request to an eNB.

Here, the initial context establishment request or the bearer establishment request may also include a controller address.

After step 804, after the establishment of a radio bearer is finished, a data link between UE and the eNB has been established, and the UE sends UL DATA to the eNB.

Step 805: the eNB can send a routing flow table request to the controller according to a locally preconfigured controller address or the controller address sent from the MME.

Steps 806 to 807: the controller performs distribution according to generated routing flow tables, and specifically can send Add messages to the eNB and an AGW so as to send the corresponding routing flow tables to the eNB and the AGW respectively.

Wherein, the routing flow tables include information such as extended identification information of a user, a user plane forwarding address and a bearer identifier. When GTP-U is used as a routing forwarding protocol in a network, the routing flow tables further include tunnel end identifiers and addresses of the AGW and the eNB. When PMIP is used as the routing forwarding protocol in the network, the routing flow tables further include universal routing packaging identifiers of the AGW and the eNB.

Here, the Add messages may be nonresponsive messages as well as responsive messages; and when the Add messages are responsive messages, the eNB and the AGW may further return response messages to the controller after receiving the routing flow tables respectively.

Figure 9:
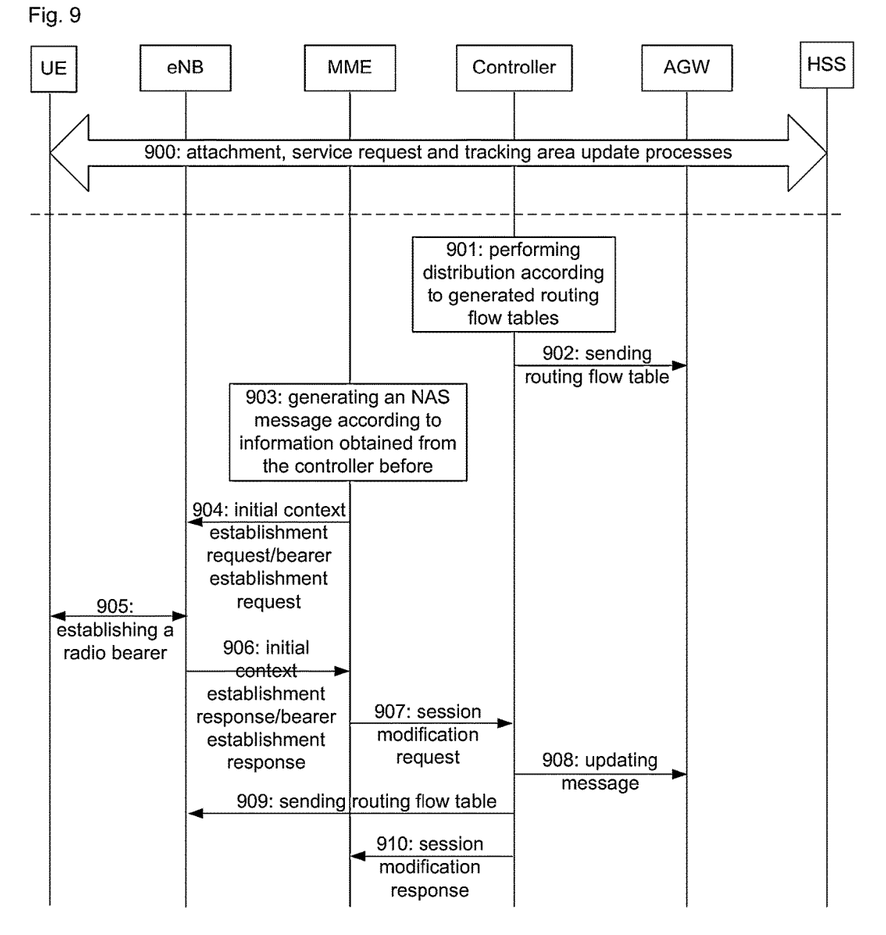
FIG. 9 is an implementation flowchart of a method for routing forwarding according to embodiment 7 of the disclosure.

FIG. 9 shows an implementation flow of a method for routing forwarding according to embodiment 7 of the disclosure, and embodiment 7 is implementation mode 6 of establishing a routing forwarding path. Embodiment 7 is similar to embodiment 3, and the difference is a process of sending a flow table to an eNB. That is, the difference is made in step 902 and step 909, and the other steps are similar, and will not be repeated here.

The difference between step 902 and step 502 is that a controller sends a routing flow table to an AGW through an Add message, but does not send the routing flow table to the eNB in step 902.

The eNB is triggered to establish a radio bearer according to an initial context establishment request or a bearer establishment request sent from an MME in step 904; and the message includes a QoS parameter and a bearer identifier, which are required by the establishment of the radio bearer.

Step 909 is similar to step 508, and the controller sends an updating request to the AGW, and also sends the routing flow table to the eNB after receiving a session modification request from the MME.

Here, the content of the routing flow table sent to the eNB is similar to that of the routing flow table sent to the eNB in step 502, and will not be repeated here.

The implementation mode can also be used for describing how to send the flow tables to a target eNB and the AGW to establish the forwarding path by the controller in a switching process. In the switching process, the controller can send flow table information to the eNB and the AGW during preparation for switching or when the UE has been switched to a target side, similar to the sending of the flow tables by the controller before the establishment of the radio bearer or after the establishment of the radio beater in the former embodiments.

In addition, the process that the controller is notified that switching has been finished through an MME updating message, and notifies the AGW to stop caching data is also similar to those in the above embodiments. The controller can be triggered by session modification request information from the MME as well as the initiation of a flow table request message of the AGW or the eNB after UP DATA and downlink data reach the AGW or the eNB to send the flow tables; and the process is similar, and will not be repeated here.

The embodiment of the disclosure further provides a system for routing forwarding, which includes a UE and an MME, and the system further includes: a controller, an eNB and an AGW, wherein the controller is configured to send pre-generated routing flow tables to the eNB and the AGW respectively; and the eNB and the AGW are configured to distribute data according to the received routing flow tables respectively.

Wherein, the controller is further configured to acquire an identifier of the UE and related information of the UE, and to generate the routing flow tables according to the identifier of the UE and the related information of the UE, wherein the related information of the UE includes UE subscription information and UE policy information.

Wherein, the controller is specifically configured to receive a session creation request from the MME, and to acquire the identifier of the UE and the UE subscription information, which are included in the session creation request; or to receive the session creation request from the MME, to acquire the identifier of the UE included in the session creation request, and to interact with an HSS to acquire the UE subscription information.

Wherein, the controller is specifically configured to acquire own preconfigured policy information, or to acquire the policy information from a PCRF.

Wherein, the controller is specifically configured to send the routing flow table to the eNB by sending an Add message to the eNB, and is further configured to send the routing flow table to the AGW by sending an Add message to the AGW after the establishment of a radio bearer is finished; and the eNB is specifically configured to establish the radio bearer according to QoS information and bearer identification information in the routing flow table, and to notify the MME after establishing the bearer.

Wherein, the controller is specifically configured to send Add messages to the eNB and the AGW so as to send the routing flow tables to the eNB and the AGW respectively; and the eNB is specifically configured to establish the radio bearer according to the QoS information and the bearer identification information in the routing flow table, and to notify the MME after establishing the bearer.

Wherein, the routing flow table sent to the AGW includes a caching instruction of caching downlink data when the AGW receives the downlink data; and the controller is further configured to send an updating message to the AGW after the establishment of the radio bearer is finished, and to notify the AGW to stop caching the downlink data.

Wherein, the AGW is specifically configured to establish a distribution path for distributing data according to the QoS information and the bearer identification information in the routing flow table.

Wherein, the controller is specifically configured to send the Add messages to the eNB and the AGW so as to send the routing flow tables to the eNB and the AGW respectively after the establishment of the radio bearer is finished.

Wherein, the eNB is specifically configured to send a routing flow table request to the controller according to a preconfigured controller address or a controller address sent from the MME after receiving UL DATA from the UE; and the controller is specifically configured to send the Add messages to the eNB and the AGW so as to send the routing flow tables to the eNB and the AGW respectively after receiving the routing flow table request.

Wherein, the controller is specifically configured to send the routing flow table to the AGW by sending the Add message to the AGW, wherein the routing flow table includes the caching instruction of caching the downlink data when the AGW receives the downlink data; to send the Add message to the eNB so as to send the routing flow table to the eNB after the establishment of the radio bearer is finished, to send the updating message to the AGW, and to notify the AGW to stop caching the downlink data and distribute the received downlink data according to the routing flow table.

Figure 10:
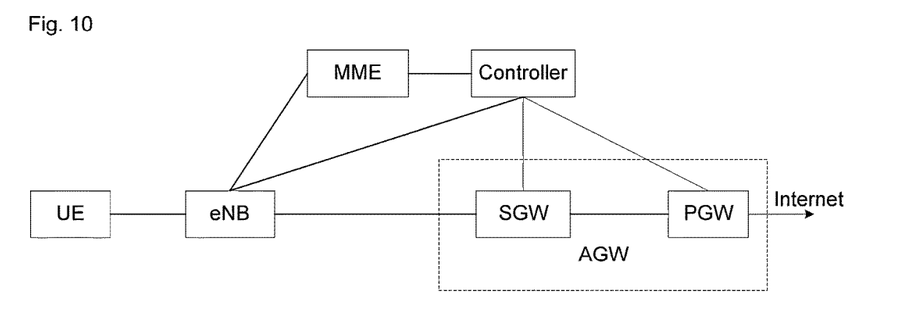
FIG. 10 is a structure diagram of a system for routing forwarding according to an embodiment of the disclosure.

In addition, FIG. 10 is a diagram under the condition that an EUTRAN is taken as an example, UTRAN access can also be taken as an example for description, and in a UTRAN access scenario, a difference is that an eNB in FIG. 10 is replaced by an RNC and an MME is replaced by an SGSN, and the other functions and sending messages are similar.

From the above, when the system for routing forwarding provided by the embodiment of the disclosure is implemented, functions of the UE are substantially the same as those of UE in a conventional EPS; the eNB is required to be functionally enhanced to support the routing flow table information sent from the controller network element and make the flow table information corresponding to the bearer established through an air interface for UL and downlink data path mapping; and a part of functions of the MME are required to be disabled in the embodiment of the invention, and a part of functions of the MME are also required to be enhanced, wherein path selection, such as functions of SGW/PGW selection and establishment of a data path and the forwarding path between the eNB and the GW, completed by the MME before will be completed by the controller, but original functions of authentication, access control, support to NAS of a domain terminal and the like are reserved.

The SGW and the PGW can be combined into the AGW, and are not required to interactively establish the forwarding path by themselves in the system, and the establishment of the forwarding path can be completed by the controller. In addition, original functions of IP address allocation or IP address allocation assistance, policy transmission and the like of the PGW are also be realized by the controller.

The controller is a new network element introduced into the EPS, is a key network element for the introduction of the OpenFlow protocol into the EPS, and is also required to support peculiar functions of the EPS network besides an original OpenFlow protocol, including but not limited to: supporting a related forwarding manner of the EPS, such as GTP-U, PMIP, supporting QoS and charging policy transmission of 3GPP, supporting the bearer identifier defined by 3GPP and supporting the user identifier defined by 3GPP. The enhanced functions are represented by mapping of the parameters with parameters in the conventional flow table or the addition of related parameters in the flow table. In order to generate the corresponding flow table information, the controller is also required to obtain a topology structure of the network, the load information of a related network element and the like and select the most proper route, and the information can be preconfigured in the controller.

Thus, the embodiment of the disclosure further provides a controller, which includes a sending module, wherein the sending module can be implemented by a Central Processing Unit (CPU), a Digital Signal Processor (DSP) or a Field-Programmable Gate Array (FPGA) in the controller, and is configured to send pre-generated routing flow tables to an eNB and an AGW respectively.

Furthermore, the sending module in the controller is further configured to acquire an identifier of UE and related information of the UE, and to generate the routing flow tables according to the identifier of the UE and the related information of the UE, wherein the related information of the UE includes UE subscription information and UE policy information.

Wherein, the sending module in the controller is specifically configured to send the routing flow table to the eNB by sending an Add message to the eNB, and is further configured to send the routing flow table to the AGW by sending an Add message to the AGW after the establishment of a radio bearer is finished.

Wherein, the sending module in the controller is specifically configured to send the Add messages to the eNB and the AGW so as to send the routing flow tables to the eNB and the AGW respectively.

Wherein, the routing flow table sent to the AGW includes a caching instruction of caching downlink data when the AGW receives the downlink data; and the sending module in the controller is further configured to send an updating message to the AGW after the establishment of the radio bearer is finished, and to notify the AGW to stop caching the downlink data.

Wherein, the sending module in the controller is specifically configured to send the Add messages to the eNB and the AGW so as to send the routing flow tables to the eNB and the AGW respectively after the establishment of the radio bearer is finished.

Wherein, the sending module in the controller is specifically configured to send the Add messages to the eNB and the AGW so as to send the routing flow tables to the eNB and the AGW respectively after receiving a routing flow table request from the eNB.

Wherein, the sending module in the controller is specifically configured to send the routing flow table to the AGW by sending the Add message to the AGW, wherein the routing flow table includes the caching instruction of caching the downlink data when the AGW receives the downlink data; and to send the Add message to the eNB so as to send the routing flow table to the eNB after the establishment of the radio bearer is finished, to send the updating message to the AGW, and to notify the AGW to stop caching the downlink data and distribute the received downlink data according to the routing flow table.

The above is only the preferred embodiment of the disclosure and not intended to limit the scope of protection of the disclosure.

What is claimed is:
1. A method for routing forwarding, comprising:
sending, by a controller, pre-generated routing flow tables to an Evolved Universal Terrestrial Radio Access Network (UTRAN) NodeB (eNB) and an Access Gateway (AGW) respectively; and
distributing, by the eNB and the AGW, data according to the received routing flow tables;
wherein the routing flow table comprises at least one of the following: extended identification of a user, a user plane forwarding address, a bearer identifier, tunnel end identifiers and addresses of the AGW and the eNB, universal routing pocketing identifiers of the AGW and the eNB;
wherein the sending the pre-generated routing flow table to the AGW by the controller comprises:

sending, by the controller, the routing flow table to the AGW by sending an Add message to the AGW, wherein the routing flow table comprises a caching instruction of catching downlink data when the AGW receives the downlink data;

correspondingly, the sending the pre-generated routing flow table to the eNB by the controller comprises:

sending, by the controller, an Add message to the eNB so as to send the routing flow table to the eNB after establishing a radio bearer is finished; and the distributing the data according to the received routing flow table by the AGW comprises:

sending, by the controller, an updating message to the AGW after establishing the radio bearer is finished, and notifying the AGW to stop caching the downlink data and distribute the received downlink data according to the routing flow table.

2. The method according to claim 1, further comprising:

acquiring, by the controller, an identifier of a User Equipment (UE) and related information of the UE; and generating, by the controller, the routing flow tables according to the identifier of the UE and the related information of the UE, wherein, the related information of the UE comprises UE subscription information and UE policy information.

3. The method according to claim 2, wherein the acquiring the identifier of the UE and the UE subscription information by the controller comprises:

receiving, by the controller, a session creation request from a Mobility Management Entity (MME), and acquiring the identifier of the UE and the UE subscription information included in the session creation request; or receiving, by the controller, the session creation request from the MME, acquiring the identifier of the UE included in the session creation request, and interacting with a Home Subscriber Server (HSS) to acquire the UE subscription information.

4. The method according to claim 2, wherein the acquiring the policy information by the controller comprises:

acquiring, by the controller, own preconfigured policy information, or acquiring the policy information from a Policy and Charging Rule Function (PCRF).

5. The method according to claim 1, wherein the sending the pre-generated routing flow table to the eNB by the controller comprises:

sending, by the controller, the routing flow table to the eNB by sending an Addition (Add) message to the eNB;

the distributing the data by the eNB according to the received routing flow table comprises:

establishing, by the eNB, a radio bearer according to Quality of Service (QoS) information and bearer identification information in the routing flow table, and notifying an MME after establishing the bearer; and the sending the pre-generated routing flow table to the AGW by the controller comprises:

sending, by the controller, the routing flow table to the AGW by sending an Add message to the AGW after the establishing the radio bearer is finished.

6. The method according to claim 1, wherein the sending the pre-generated routing flow tables to the eNB and the AGW respectively by the controller comprises:

sending, by the controller, the routing flow tables to the eNB and the AGW by sending an Add messages to the eNB and the AGW respectively; and the distributing the data according to the received routing flow table by the eNB comprises:

establishing, by the eNB, a radio bearer according to QoS information and bearer identification information in the routing flow table, and notifying an MME after establishing the bearer.

7. The method according to claim 6, wherein the routing flow table sent to the AGW comprises a caching instruction of caching downlink data when the AGW receives the downlink data; and correspondingly, further comprising: before the distributing the data according to the received routing flow table by the AGW, sending, by the controller, an updating message to the AGW after the establishing the radio bearer is finished, and notifying the AGW to stop caching the downlink data.

8. The method according to claim 1, wherein the sending the pre-generated routing flow tables to the eNB and the AGW respectively by the controller comprises:

sending, by the controller, an Add messages to the eNB and the AGW so as to send the routing flow tables to the eNB and the AGW respectively after establishing a radio bearer is finished.

9. The method according to claim 1, wherein the sending the pre-generated routing flow tables to the eNB and the AGW respectively by the controller comprises:

sending, by the eNB, a routing flow table request to the controller according to a preconfigured controller address or a controller address sent from an MME after receiving Uplink (UL) DATA from a User Equipment (UE); and sending, by the controller, an Add messages to the eNB and the AGW so as to send the routing flow tables to the eNB and the AGW respectively after receiving the routing flow table request.

10. A controller, comprising

A memory for storing instructions; and

A processor coupled with the memory for implement a sending module configured to send pre-generated routing flow tables to an Evolved Universal Terrestrial Radio Access Network (UTRAN) NodeB (eNB) and an Access Gateway (AGW) respectively;

wherein the routing flow table comprises at least one of the following: extended identification of a user, a user plane forwarding address, a bearer identifier, tunnel end identifiers and addresses of the AGW and the eNB, universal routing pocketing identifiers of the AGW and the eNB;

wherein the sending module is configured to send the routing flow table to the AGW by sending an Add message to the AGW; wherein the routing flow table comprises a caching instruction of caching downlink data when the AGW receives the downlink data; and the sending module is further configured to send an Add message to the eNB so as to send the routing flow table to the eNB after establishing a radio bearer is finished, to send an updating message to the AGW, and to notify the AGW to stop caching the downlink data and distribute the received downlink data according to the routing flow table.

11. The controller according to claim 10, wherein the sending module is further configured to acquire an identifier of a User Equipment (UE) and related information of the UE, and to generate the routing flow tables according to the identifier of the UE and the related information of the UE; wherein the related information of the UE comprises UE subscription information and UE policy information.

12. The controller according to claim 10, wherein the sending module is configured to send the routing flow table to the eNB by sending an Addition (Add) message to the eNB, and is further configured to send the routing flow table to the AGW by sending an Add message to the AGW after establishing a radio bearer is finished.

13. The controller according to claim 10, wherein the sending module is configured to send an Add messages to the eNB and the AGW so as to send the routing flow tables to the eNB and the AGW respectively.

14. The controller according to claim 13, wherein the routing flow table sent to the AGW comprises a caching instruction of caching downlink data when the AGW receives the downlink data; and     the sending module is further configured to send an updating message to the AGW after establishing a radio bearer is finished, and to notify the AGW to stop caching the downlink data.

15. The controller according to claim 10, wherein the sending module is configured to send an Add messages to the eNB and the AGW so as to send the routing flow tables to the eNB and the AGW respectively after establishing a radio bearer is finished.

16. The controller according to claim 10, wherein the sending module is configured to send an Add messages to the eNB and the AGW so as to send the routing flow tables to the eNB and the AGW respectively after receiving a routing flow table request from the eNB.

\* \* \* \* \*